United States Patent [19]
Wetzel et al.

[11] Patent Number: 5,131,681
[45] Date of Patent: Jul. 21, 1992

[54] MOTOR VEHICLE KNEE PROTECTION DEVICE

[75] Inventors: Guido Wetzel, Böblingen; Wolfgang Henseler, Tübingen; Manfred Müller, Deizisau, all of Fed. Rep. of Germany

[73] Assignee: Mercedes-Benz AG, Fed. Rep. of Germany

[21] Appl. No.: 722,167

[22] Filed: Jun. 27, 1991

[30] Foreign Application Priority Data

Jul. 3, 1990 [DE] Fed. Rep. of Germany ....... 4021145

[51] Int. Cl.$^5$ ..................... B60R 21/045; B60R 22/02
[52] U.S. Cl. ..................................... 280/753; 180/268; 280/801
[58] Field of Search ............... 280/751, 752, 753, 801; 180/268

[56] References Cited

U.S. PATENT DOCUMENTS

| | | | |
|---|---|---|---|
| 3,782,492 | 1/1974 | Hollins | 280/753 |
| 4,099,743 | 7/1978 | Non | 280/753 |
| 4,951,963 | 8/1990 | Behr et al. | 280/753 |

FOREIGN PATENT DOCUMENTS

| | | |
|---|---|---|
| 2537212 | 3/1973 | Fed. Rep. of Germany. |
| 2248568 | 4/1974 | Fed. Rep. of Germany. |
| 2634222 | 2/1978 | Fed. Rep. of Germany. |
| 3413768 | 7/1985 | Fed. Rep. of Germany. |

Primary Examiner—Kenneth R. Rice
Attorney, Agent, or Firm—Evenson, Wands, Edwards, Lenahan & McKeown

[57] ABSTRACT

A restraining system for knee protection in a motor vehicle having a safety belt system includes an element which deforms plastically upon impact of a vehicle occupant's knees. The element can be transferred by means of a servo drive from a comfortable remote-from-the-knee position into a securable, restraining close-to-the-knee position. The restraining system permits the largest degree of freedom of movement for the vehicle occupant given specific peripheral conditions or prevents the vehicle occupants slipping away towards the foot space of the vehicle. The signal for transferring the knee protection into its close-to-the-knee position in the driving mode occurs by a device triggered in the event of the non-use of a three-point safety belt system.

6 Claims, 1 Drawing Sheet

MOTOR VEHICLE KNEE PROTECTION DEVICE

BACKGROUND AND SUMMARY OF THE INVENTION

The invention relates to a knee protection device in a motor vehicle and, more particularly, to a knee protection device including an element which plastically deforms in the event of an impact of the vehicle occupant's knees. The element can be transferred by means of a servo drive from a remote-from-the-knee position into a securable close-to-the-knee position, thus allowing the vehicle occupant to easily get in and out of the motor vehicle comfortably.

German Patent Document No. 25 37 212 discloses a knee protection device which can be moved back into its out-of-use setting when its associated door is opened and which, together with a safety belt system consisting of a diagonal belt, forms an effective restraining system.

However, there is needed a restraining system, including a knee protector, which, in consistent use, permits the largest possible degree of freedom of movement and, when necessary, prevents a dangerous slipping away towards the foot space, while indicating the incorrect use of the restraining system.

This need is met in that the instruction or signal for transferring the knee protection device into its close-to-the-knee position occurs in the driving mode by means which are the event of the correct use of the three-point safety belt, the knee protection thus remains in its remote-from-the-knee setting vehicle occupant, while when the car begins to move a vehicle occupant not wearing the safety belt is made aware of his incorrect behavior by the knee protection extending into its close-to-the-knee position. If the three-point safety belt is subsequently put on, the knee protection moves back into its out-of-use setting while, if the safety belt is not put on, it remains in its activated setting and thus, in the event of an impact, protects the respective vehicle occupant from sliding off towards the foot space which can involve injuries.

In an exemplary embodiment of the invention, the means which give the trigger instruction consist of a contact which can be actuated by the insertable belt fastener.

The means can, however, also be formed by a contact device which senses the winding diameter of a belt roller.

In a preferred exemplary embodiment of the invention, the knee protection has at least one bracket which can be displaced in a guide. Both the guide and the bracket are provided with locking teeth facing one another in the extended position. The locking teeth, preferably on the guide side, are covered by a hose of easily deformable material which is deformed by a loading of the bracket caused by an impact, by its locking teeth when they engage in the locking teeth of the guide. Thus, a lock and support of a simple design which can reliably respond already during the extension process is obtained.

Other objects, advantages and novel features of the present invention will become apparent from the following detailed description of the invention when considered in conjunction with the accompanying drawings.

DETAILED DESCRIPTION OF THE DRAWINGS

Figure 1:
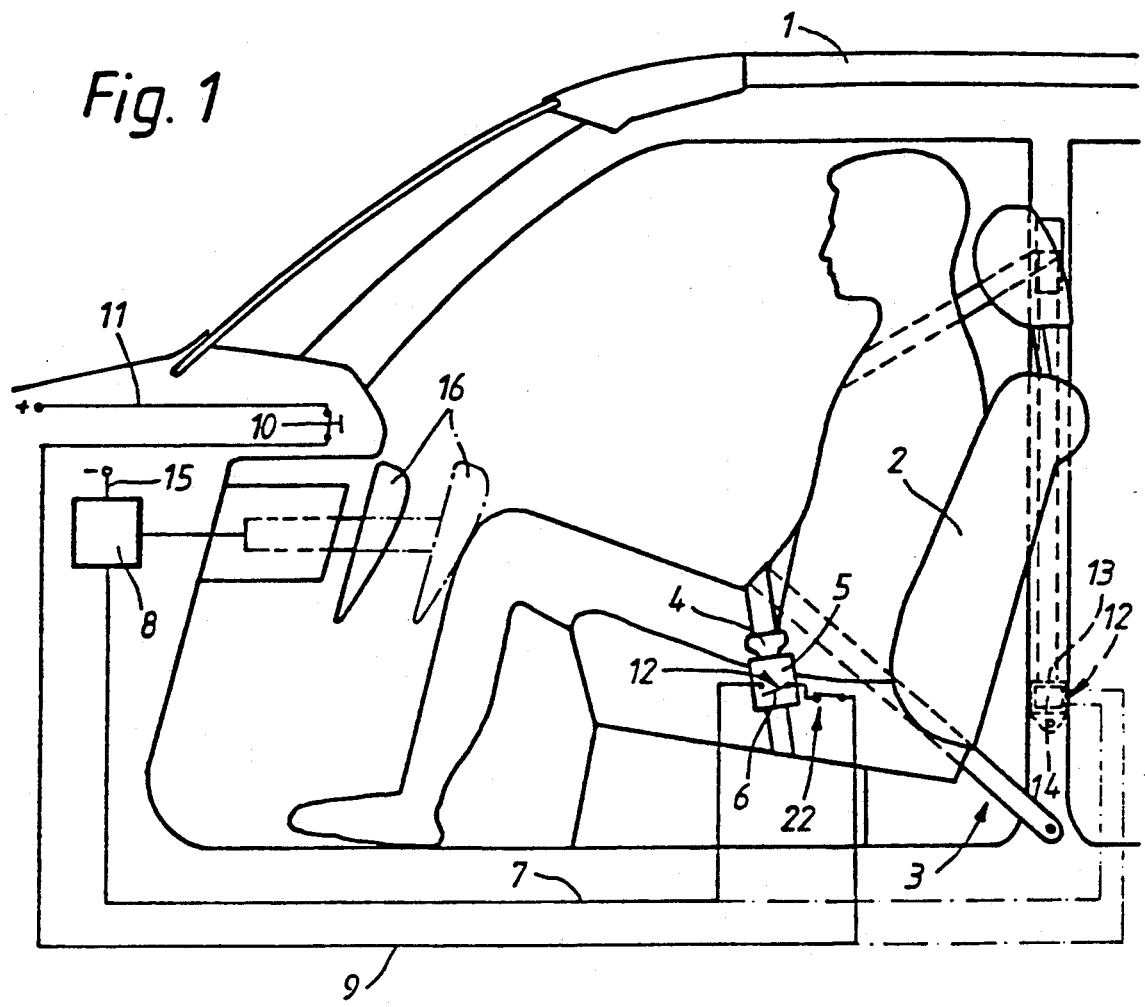
FIG. 1 shows a diagrammatic side view of a knee protection assigned to a front seat passenger.

A passenger vehicle 1 (only partially illustrated) has a front passenger seat 2. The user of the front passenger seat 2 is protected in a known manner by a three-point safety belt system 3. By inserting the associated belt fastener 4 into the belt lock 5, a contact 6 accommodated at that point is opened. The contact is connected via a line 7 to a servo element 8 and via a line 9 to a further contact 10 which, itself, is connected via a line 11 to the positive pole of a vehicle battery (not shown). The contact 10 which can be, for example, a component of an ignition starter switch or else can form a component of a switch which already closes at a low driving speed, is closed and thus signals the driving mode of the motor vehicle.

The contact 6 in the belt lock 5 represents a means 12 which provides information or a signal as to whether the three-point safety belt system 3 has been put on or not. The means 12 can also—as shown by dot-dash lines—be formed by a contact device 14 which senses the winding diameter of a belt roller 13. When the three-point safety belt system 3 has been put on, the contact 6 or the contact device 14 is opened so that the servo element 8 which connects via a line 15 to the negative pole of the vehicle battery (not illustrated) is not actuated and thus the knee protection 16 coupled thereto remains in its retracted position. This gives the greatest degree of freedom of movement to the respective passenger.

If, on the other hand, the three-point safety belt system is not in use when contact 10 is closed, and thus when in the driving mode, the contact 6 or the contact device 14 is closed so that the servo element 8 is actuated and transfer the knee protection 16 into the close-to-the-knee position of the vehicle occupant indicated by dot-dash lines. It is thus signalled to this vehicle occupant that the available three-point safety belt system 3 is not being utilized. If the three-point safety belt system is then subsequently put on, the knee protection 16 moves back into its initial position. If, on the other hand, the three-point safety belt system 3 continues not to be used, the knee protection 16 remains in its close-to-the-knee extended position which, in the event of an impact, prevents the respective vehicle occupant from sliding off towards the foot space by immediately supporting his knees.

Figure 2:
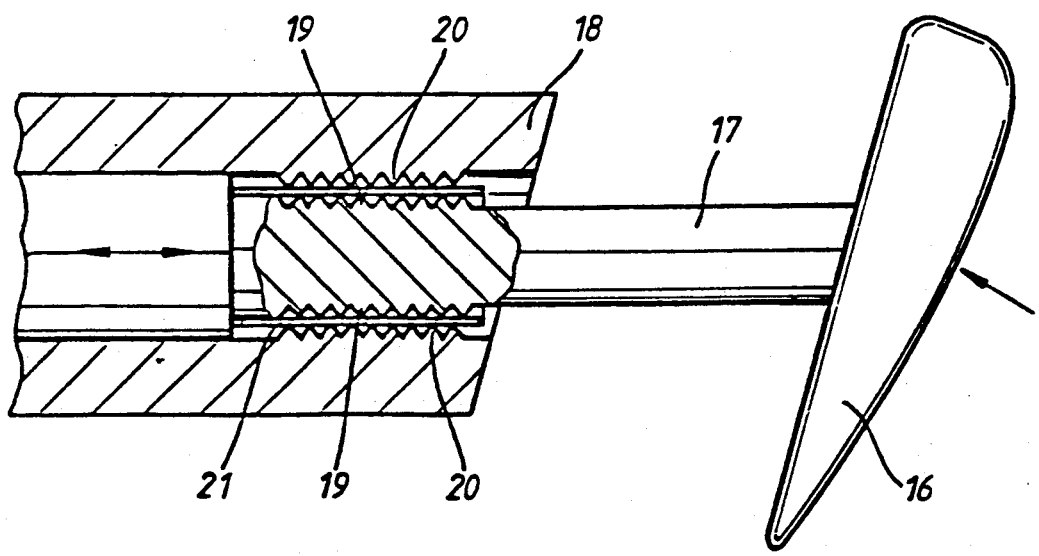
FIG. 2 illustrates the position of the locking teeth on the guide side and on the bracket side with the knee protection fully extended.

According to FIG. 2, the knee protection 16 is received by at least one bracket 17 which can be displaced in the longitudinal direction of the vehicle in a guide 18 fixed to the vehicle. The bracket 17 has a section with locking teeth 19 and the guide 18 has a section with locking teeth 20, the arrangement being such that the locking teeth 19 and 20 face one another when the knee protection 16 is extended. The locking teeth 20 are covered by a hose 21 of easily deformable material so that during normal driving retraction and extension of the knee protection 16 occur without mutual contacting of the teeth.

If, in the event of an impact, the knees of the respective vehicle occupant collide with the extended knee protection 16, an induction of force occurs into the knee protection in the direction of the illustrated arrow. As a result, the bracket 17 carries out a tilting movement in which the teeth 19 press through the hose 21 which deforms and thus rest against the teeth 20 so that a reliable induction of force is ensured. This supporting effect is also brought about if an impact should occur already during the extension process of the knee protection 16.

If a one-piece knee protection extending over the entire width of the passenger compartment is not provided but rather a knee protection section placed in front of each respective vehicle occupant sitting at the front, a seat contact switch 22 (FIG. 1) is accommodated in the seat 2 of the front seat passenger, the contact of which switch is not closed until the seat is occupied. It is thus prevented that the knee protection section can extend even when the seat 2 of the front seat passenger is unoccupied.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A knee protection device in a motor vehicle having a safety belt system, comprising:
    a plastically deforming element which deforms in the event of an impact of the knees of a vehicle occupant;
    servo drive means for transferring said element from a remote-from-the-knee position permitting a vehicle occupant to easily get into and out of the motor vehicle comfortably into a securable close-to-the-knee position;
    means for providing a signal for transferring the knee protection device into its close-to-the-knee position, said signal means providing said signal in the driving mode and being triggered when a three-point safety belt system is not used.

2. A knee protection device according to claim 1, wherein said means for providing a signal comprise a contact which can be actuated by an insertable belt fastener of the three-point safety belt system.

3. A knee protection device according to claim 1, wherein said means for providing a signal are formed by a contact device which senses the winding diameter of a belt roller.

4. A knee protection device according to claim 1, wherein said knee protection device further comprises at least one bracket which can be displaced in a guide, and both said guide and said bracket are provided with locking teeth facing one another in the extended position of the knee protection device, wherein said locking teeth on the guide side are covered by a hose made of an easily deformable material which is deformed by a loading of the bracket caused by an impact, said locking teeth engaging in the locking teeth of the guide.

5. A knee protection device according to claim 2, wherein said knee protection device further comprises at least one bracket which can be displaced in a guide, and both said guide and said bracket are provided with locking teeth facing one another in the extended position of the knee protection device, wherein said locking teeth on the guide side are covered by a hose made of an easily deformable material which is deformed by a loading of the bracket caused by an impact, said locking teeth engaging in the locking teeth of the guide.

6. A knee protection device according to claim 3, wherein said knee protection device further comprises at least one bracket which can be displaced in a guide, and both said guide and said bracket are provided with locking teeth facing one another in the extended position of the knee protection device, wherein said locking teeth on the guide side are covered by a hose made of an easily deformable material which is deformed by a loading of the bracket caused by an impact, said locking teeth engaging in the locking teeth of the guide.

* * * * *